UNITED STATES PATENT OFFICE.

JAMES H. DILKS, OF JERSEY CITY, ASSIGNOR TO PATRICK McGIEHAN, OF BAYONNE CITY, NEW JERSEY.

COMPOSITION PAINT FOR SHIPS' BOTTOMS, DRY-DOCKS, &c.

SPECIFICATION forming part of Letters Patent No. 308,066, dated November 18, 1884.

Application filed April 8, 1884. (No specimens.)

*To all whom it may concern:*

Be it known that I, JAMES H. DILKS, of Jersey City, in the county of Hudson and State of New Jersey, have invented a new and useful Composition Paint, of which the following is a specification.

This invention relates to composition paints, such as those used in painting the bottoms of ships, dry-docks, &c. It has for its object the preservation of all surfaces to which it is applied, by preventing the same from becoming fouled, corroded, worm-eaten, or in any way destroyed by contact with water.

I am aware that composition paints have heretofore been made and patented for the same purpose; but the majority of these paints not only failed to accomplish what was expected of them, but they produced a very rough surface, which made their use objectionable in many cases. In this respect my composition paint differs from all others having in view the same object, inasmuch as it produces a perfectly smooth and hard surface.

To make my composition paint, take any stated amount of sulphate of copper and dissolve it in either hot or cold water at the proportion of one gallon of water to one pound of sulphate of copper, then suspend metallic zinc, preferably in the sheet form, in the solution until the liquor on top is clear, then filter and dry the precipitate. In another receptacle, take any stated amount of chloride of antimony and add to it hyposulphite of soda (with the aid of heat) as long as a precipitate is formed, then filter and dry this also, and mix the two precipitates in the proportion of two parts of the antimony to eight parts of the copper, and grind in any vehicle such as linseed-oil, varnish, &c.

Having thus described my invention, what I specially claim, and desire to secure by Letters Patent, is—

The herein-described composition paint, consisting of sulphate of copper and metallic zinc treated as described, chloride of antimony and hyposulphite of soda in the proportion and manner specified, with linseed-oil, varnish, or any desirable vehicle mixed therewith, the same to be used for the purpose of preserving all surfaces that may be submerged in water or in any way subjected to the action thereof.

In testimony that I claim the foregoing improved composition paint as above described I have hereunto set my hand this 5th day of April, 1884.

JAMES H. DILKS.

Witnesses:
GEO. B. MORRIS,
HARRY McGIEHAN.